United States Patent
Narita

(10) Patent No.: US 9,745,754 B1
(45) Date of Patent: Aug. 29, 2017

(54) SNOW GUARD STRUCTURE

(71) Applicant: Yanegijutsukenkyujo Co., Ltd., Takahama-shi, Aichi (JP)

(72) Inventor: Shinya Narita, Takahama (JP)

(73) Assignee: Yanegijutsukenkyujo Co., Ltd., Takahama-shi (JP)

( * ) Notice: Subject to any disclaimer, the term of this patent is extended or adjusted under 35 U.S.C. 154(b) by 0 days.

(21) Appl. No.: 15/271,925

(22) Filed: Sep. 21, 2016

(51) Int. Cl.
*E04D 13/10* (2006.01)
*H02S 20/23* (2014.01)
*H02S 30/10* (2014.01)

(52) U.S. Cl.
CPC .............. *E04D 13/10* (2013.01); *H02S 20/23* (2014.12); *H02S 30/10* (2014.12)

(58) Field of Classification Search
CPC ......... E04D 13/10; H02S 40/30; H02S 20/30; H02S 20/23; H01L 31/0482
See application file for complete search history.

(56) References Cited

U.S. PATENT DOCUMENTS

| | | | | |
|---|---|---|---|---|
| 5,411,154 A * | 5/1995 | Vargo | ...................... | F16B 12/30 211/189 |
| 8,938,932 B1 * | 1/2015 | Wentworth | ............. | H02S 20/23 52/173.3 |
| 2004/0163338 A1 * | 8/2004 | Liebendorfer | ......... | F24J 2/5207 52/173.1 |
| 2006/0086382 A1 * | 4/2006 | Plaisted | ................. | F24J 2/5207 136/244 |
| 2007/0269155 A1 * | 11/2007 | Mori | ...................... | B60B 27/00 384/544 |
| 2013/0125492 A1 * | 5/2013 | Molek | .................... | F24J 2/5211 52/489.1 |
| 2013/0333305 A1 * | 12/2013 | Stearns | ................... | E04D 13/10 52/24 |
| 2013/0340811 A1 * | 12/2013 | Danning | ................. | H02S 20/23 136/251 |
| 2015/0107168 A1 * | 4/2015 | Kobayashi | ............. | F24J 2/5245 52/173.3 |
| 2015/0218822 A1 * | 8/2015 | Blazley | ..................... | E04D 3/30 52/173.3 |
| 2015/0288320 A1 * | 10/2015 | Stearns | ................... | H02S 20/23 52/173.3 |
| 2016/0319550 A1 * | 11/2016 | Christian | ............... | F24J 2/5249 |

FOREIGN PATENT DOCUMENTS

JP      3776631 B    12/2000

* cited by examiner

*Primary Examiner* — Paola Agudelo
(74) *Attorney, Agent, or Firm* — Kenichiro Yoshida

(57) ABSTRACT

A snow guard structure has the configuration in which a first frame body holding a ridge-side end side of a solar cell panel and a second frame body holding an eaves-side end side of an adjacent solar cell panel are fixed to a roof surface such that spaces are formed under their bottom face portions, and a snow guard fitting includes an upper abutment piece abutting against upper face portions of the two frame bodies, a lower abutment piece abutting against bottom face portions of the two frame bodies, an external thread member extending upward from the lower abutment piece and penetrating through the upper abutment piece and fastening the upper abutment piece and the lower abutment piece by screwing with an internal thread between the two frame bodies, and a snow guard portion extending upward from the upper abutment piece.

4 Claims, 6 Drawing Sheets

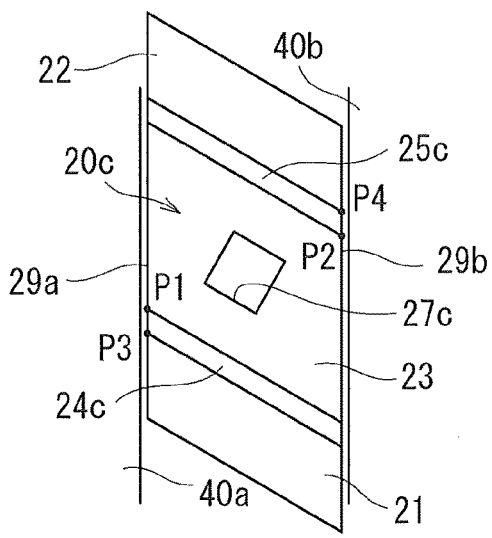
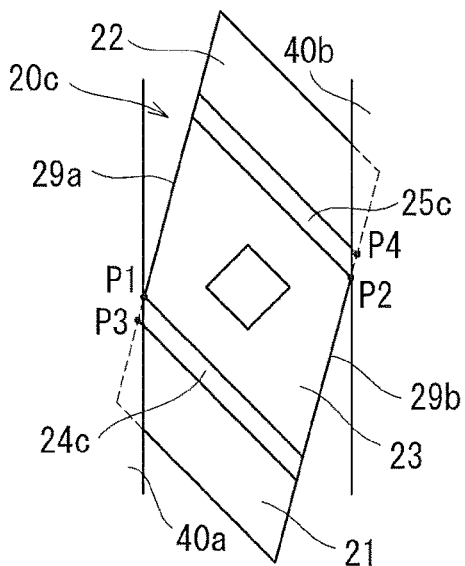
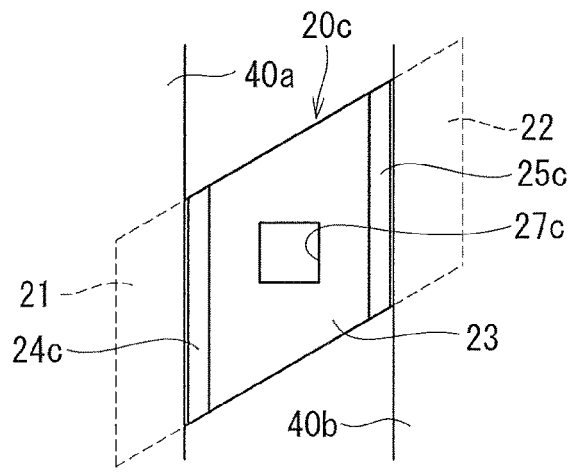

SNOW GUARD STRUCTURE

BACKGROUND OF THE INVENTION

Field of the Invention

The present invention relates to a snow guard structure for roof on which a solar cell panel is installed, and a snow guard fitting that is used for the snow guard structure.

Description of the Related Art

Generally, a structure for snow guard is provided on inclined roof in snowy areas in order to prevent snow accumulated on the roof from slipping down a roof surface and falling from the eaves. Such a structure is also required to be provided on roof on which a solar cell panel is installed and there is a structure in which a snow guard is integrally formed with a frame body holding an outer circumferential edge of the solar cell panel. However, when the snow guard is integrally formed with the frame body, the whole frame body needs to be replaced if the snow guard is damaged. Furthermore, the frame body including the snow guard and a frame body for a solar cell panel that is installed on roof requiring no snow guard need to be separately manufactured.

Meanwhile, provision of a snow guard through a member for fixing a solar cell panel onto roof has been proposed (see Japanese Patent No. 3776631). With the technique as disclosed in Japanese Patent No. 3776631, frame bodies of adjacently arranged solar cell panels are placed on long crosspiece members (rails) arranged in parallel at an interval on the roof. Furthermore, a supporting member arranged between the two frame bodies fixes the frame bodies to the crosspiece member. A cover covering the supporting member between the frame bodies is mounted on the supporting member and the snow guard is provided integrally with the cover. This technique provides an advantage that common frame bodies for the solar cell panels which are installed on roof requiring no snow guard can be used.

However, with the technique as disclosed in Japanese Patent No. 3776631, the snow guard is mounted on the crosspiece member using the supporting member. Therefore, an installation position of the snow guard is limited to a position on the supporting member and the number of snow guards is limited to the number of supporting members. The degree of easiness of the slip-down and falling of snow depends on various conditions such as snow accumulation amount, the inclination degree of the roof, the length of the roof in the roof inclination direction, and the roof facing direction. Some roofs such as roof facing a neighbor's site and roof facing a public road are required to prevent the slip-down and falling of snow with higher importance whereas others are required to prevent the slip-down and falling of snow with lower importance.

In view of this, a technique capable of providing the snow guard on the roof on which the solar cell panel is installed with high degree of freedom of the installation position of the snow guard and the installation number thereof has been desired.

SUMMARY OF THE INVENTION

The present invention has been made in consideration of the above-mentioned circumstances, and an object thereof is to provide a snow guard structure in which a snow guard fitting can be mounted on roof on which a solar cell panel is installed with high degree of freedom of an installation position and the installation number thereof, and the snow guard fitting that is used for the snow guard structure.

In order to achieve the above-mentioned object, a snow guard structure according to an aspect of the invention is "a snow guard structure including a snow guard fitting which is mounted on roof on which solar cell panels are installed, wherein a first frame body holding a ridge-side end side of the solar cell panel arranged at an eaves side in the solar cell panels arranged adjacently on the roof and a second frame body holding an eaves-side end side of the solar cell panel arranged at a ridge side are fixed onto a roof surface such that spaces are formed under bottom face portions of the first frame body and the second frame body, and the snow guard fitting includes: an upper abutment piece having a first upper abutment portion abutting against an upper face portion of the first frame body at one end side, a second upper abutment portion abutting against an upper face portion of the second frame body at the other end side, and an upper connecting portion connecting the first upper abutment portion and the second upper abutment portion; a lower abutment piece having a first lower abutment portion abutting against a bottom face portion of the first frame body at one end side, a second lower abutment portion abutting against a bottom face portion of the second frame body at the other end side, and a lower connecting portion connecting the first lower abutment portion and the second lower abutment portion; an external thread member extending upward from the lower abutment piece and penetrating through the upper abutment piece and fastening the upper abutment piece and the lower abutment piece by screwing an external thread formed on an outer circumferential surface with an internal thread between the first frame body and the second frame body; and a snow guard portion extending upward from the upper abutment piece to be higher than upper face portions of the first frame body and the second frame body."

Examples of the configuration of the "upper abutment piece" can include the configuration in which the first upper abutment portion and the second upper abutment portion are connected to each other by the upper connecting portion having a portion with a height different from those of the first upper abutment portion and the second upper abutment portion, the configuration that is formed by one flat plate, in which one end side of which corresponds to the first upper abutment portion, the other end side of which corresponds to the second upper abutment portion, and an intermediate portion of which corresponds to the upper connecting portion, and the configuration in which the first upper abutment portion and the second upper abutment portion are connected to each other by the upper connecting portion having a height equal to those of the first upper abutment portion and the second upper abutment portion, a portion abutting against a lateral face portion of the first frame body projects downward from the boundary between the first upper abutment portion and the upper connecting portion, and a portion abutting against a lateral face portion of the second frame body projects downward from the boundary between the second upper abutment portion and the upper connecting portion.

Examples of the configuration of the "lower abutment piece" can include the configuration that is formed by one flat plate, in which one end side of which corresponds to the first lower abutment portion, the other end side of which corresponds to the second lower abutment portion, and an intermediate portion of which corresponds to the lower connecting portion, the configuration in which the first lower abutment portion and the second lower abutment portion are connected to each other by the lower connecting portion with a portion having a height different from those of the first lower abutment portion and the second lower abutment portion, and the configuration in which the first lower abutment portion and the second lower abutment portion are connected to each other by the lower connecting portion having a height equal to those of the first lower abutment portion and the second lower abutment portion, a portion abutting against the lateral face portion of the first frame body projects upward from the boundary between the first lower abutment portion and the lower connecting portion, and a portion abutting against the lateral face portion of the second frame body projects upward from the boundary between the second lower abutment portion and the lower connecting portion.

Examples of the configuration of the "external thread member extending upward from the lower abutment piece" include the configuration in which the lower abutment piece has a through-hole and the external thread member extending from a head portion having a larger diameter than that of the through-hole is inserted through the through-hole from below, and the configuration in which a lower end portion of the external thread member is firmly fixed to the lower abutment piece.

Examples of the configuration in which the "external thread member" "fastens the upper abutment piece and the lower abutment piece by screwing an external thread formed on an outer circumferential surface with an internal thread" include the configuration in which the internal thread of a nut is screwed, from above the upper abutment piece, with the external thread of the external thread member penetrating through a hole provided on the upper abutment piece so as to fasten the upper abutment piece and the lower abutment piece, the configuration in which the internal thread is provided on the inner circumference of a through-hole of the upper abutment piece when the upper abutment piece is formed by one flat plate, and the external thread of the external thread member is screwed with the internal thread so as to fasten the upper abutment piece and the lower abutment piece, and the configuration in which a through-hole is formed on the upper abutment piece, a nut is firmly attached to the upper abutment piece such that an internal thread hole of the nut communicates with the through-hole, and the external thread of the external thread member is screwed with the internal thread hole so as to fasten the upper abutment piece and the lower abutment piece.

The "snow guard portion" can be configured to extend upward from the first upper abutment portion, the second upper abutment portion, or the upper connecting portion connecting the first upper abutment portion and the second upper abutment portion at the same height. In this case, it is needless to say that the snow guard portion is configured to extend upward to be higher than the upper face portions of the first frame body and the second frame body. Furthermore, the "snow guard portion" can be also configured to extend upward from the upper connecting portion with the portion connecting the first upper abutment portion and the second upper abutment portion at the height different from those of the first upper abutment portion and the second upper abutment portion. In this case, even in the case where the snow guard portion extends from a portion of the upper connecting portion, which has a height lower than those of the first upper abutment portion and the second upper abutment portion, the snow guard portion extends upward to be higher than the upper face portions of the first frame body and the second frame body.

The snow guard structure having the above configuration can be constructed in the following manner, for example. First, the lower abutment piece of the snow guard fitting is located between the first frame body and the second frame body such that the first lower abutment portion is located under the bottom face portion of the first frame body and the second lower abutment portion is located under the bottom face portion of the second frame body by gripping the external thread member extending upward from the lower abutment piece. When the width of the lower abutment piece (distance between a pair of lateral sides of the lower abutment piece, which extend in the direction toward the second lower abutment portion from the first lower abutment portion) is smaller than a space between the first frame body and the second frame body, the lower abutment piece is inserted into between the first frame body and the second frame body from above, and then, is made to rotate about an axis of the external thread member at a desired mounting position. With this manner, the first lower abutment portion and the second lower abutment portion are located under the corresponding bottom face portions of the first frame body and the second frame body. Alternatively, in a state where the first lower abutment portion and the second lower abutment portion are located at the positions lower than the corresponding bottom face portions of the first frame body and the second frame body, the external thread member extending from the lower abutment piece may be inserted into between the first frame body and the second frame body inward from the end sides of the first frame body and the second frame body and be made to slide to a desired attaching position. Subsequently, the first lower abutment portion and the second lower abutment portion are made to abut against the corresponding bottom face portions of the first frame body and the second frame body. Thereafter, the external thread member is made to penetrate through the upper abutment piece from below and the first upper abutment portion and the second upper abutment portion of the upper abutment piece are made to abut against the corresponding upper face portions of the first frame body and the second frame body. Then, the internal thread is screwed with the external thread of the external thread member so as to fasten the upper abutment piece and the lower abutment piece. With this, the snow guard structure in which the snow guard fitting is fixed to the first frame body and the second frame body can be constructed.

With the snow guard structure constructed as described above, the snow guard portion can prevent slip-down and falling of snow accumulated on the solar cell panels because the snow guard portion extends upward to be higher than the upper face portions of the first frame body and the second frame body holding the solar cell panels, respectively.

In the snow guard structure having this configuration, the upper abutment piece and the lower abutment piece fastened by the external thread member support the first frame body and the second frame body therebetween from above and below, so that the snow guard fitting is held on the first frame body and the second frame body. Accordingly, unlike the above-mentioned conventional technique, the snow guard structure in which the snow guard fitting is installed can be constructed independently of members for fixing the first frame body and the second frame body onto the roof surface in order to install the solar cell panels on the roof. With this, the installation position of the snow guard fitting and the installation number thereof can be set with high degree of freedom in accordance with various conditions such as snowfall amount in areas in which the solar cell panels are installed, inclination of the roof, the length of the roof, the roof facing direction, and the degree of importance for preventing the slip-down and falling of snow.

The snow guard fitting in the snow guard structure having this configuration is held on the first frame body and the second frame body by fastening the upper abutment piece and the lower abutment piece as separate bodies by the external thread member. Accordingly, the snow guard fitting is attached to various frame bodies having different heights so as to construct the snow guard structure.

Furthermore, the upper abutment piece and the lower abutment piece are fixed by being fastened by the external thread member. Therefore, fixing of the snow guard fitting to the first frame body and the second frame body is firm. Accordingly, the snow guard structure having this configuration is excellent in resistance to load of accumulated snow.

In addition, the snow guard fitting is configured so as to integrate the upper abutment piece and the lower abutment piece as the separate bodies with each other by the external thread member. The lower abutment piece can be located at the position lower than the bottom face portions of the frame bodies at a desired attaching position by being inserted from above so as to pass through between the two frame bodies or being inserted into and made to slide between the frame bodies inward from the end sides of the frame bodies in a state of being located at the position lower than the bottom face portions of the frame bodies, as described above. With this, the snow guard structure having this configuration provides an advantage that the snow guard fitting can be mounted on the frame bodies even after the two frame bodies are fixed onto the roof.

Furthermore, the snow guard fitting used in the structure capable of being attached to the first frame body and the second frame body only by fastening the upper abutment piece and the lower abutment piece by the external thread member is configured extremely simply. Therefore, the snow guard structure can be constructed extremely simply in comparison with the case where the snow guard fitting can be fixed to the frame bodies using screws, nails, or the like.

The snow guard structure according to the aspect of the invention can be configured such that "the lower abutment piece of the snow guard fitting has a maximum length between a pair of lateral sides extending in a direction toward the second lower abutment portion from the first lower abutment portion, which is smaller than a space between the first frame body and the second frame body" in addition to the above-mentioned configuration.

With this configuration, when the snow guard fitting is attached, the lower abutment piece can be inserted into between the first frame body and the second frame body from above at a desired attaching position. Therefore, operations can be performed more easily than the case where the external thread member is inserted inward from the end sides of the first frame body and the second frame body and is made to slide between the frame bodies in the state where the lower abutment piece is located at the position lower than the bottom face portions of the frame bodies. Furthermore, when the first frame body and the second frame body are fixed onto the roof surface by fixing members, the snow guard fitting can be attached to the first frame body and the second frame body even at a position between one fixing member and the adjacent fixing member.

The snow guard structure according to the aspect of the invention can be configured such that "the upper connecting portion of the snow guard fitting has a first lateral face abutment portion extending downward from the first upper abutment portion and abutting against a lateral face portion of the first frame body, a second lateral face abutment portion extending downward from the second upper abutment portion and abutting against a lateral face portion of the second frame body, and a connecting intermediate portion connecting the first lateral face abutment portion and the second lateral face abutment portion" in addition to the above-mentioned configuration.

With this configuration, the upper abutment piece includes the first lateral face abutment portion and the second lateral face abutment portion abutting against the corresponding lateral face portions of the first frame body and the second frame body in addition to the first upper abutment portion and the second upper abutment portion abutting against the corresponding upper face portions of the first frame body and the second frame body. That is to say, the upper abutment piece abuts against the two frame bodies from above and abuts against the lateral face portions of the frame bodies outward between the two frame bodies. With the abutment, even when external force is applied to the snow guard portion, the upper abutment piece does not rotate about the axis of the external thread member, and eventually, the whole snow guard fitting does not rotate about the axis of the external thread member. Therefore, the snow guard structure in which the posture of the snow guard fitting attached to the first frame body and the second frame body is stable can be constructed.

Furthermore, a snow guard fitting according to another aspect of the invention is a "snow guard fitting that is used for the snow guard structure according to the above-mentioned aspect of the invention, the snow guard fitting including an upper abutment piece having a first upper abutment portion at one end side, a second upper abutment portion at the other end side, and an upper connecting portion connecting the first upper abutment portion and the second upper abutment portion, a lower abutment piece having a first lower abutment portion at one end side, a second lower abutment portion at the other end side, and a lower connecting portion connecting the first lower abutment portion and the second lower abutment portion, a long bar-shaped external thread member having an external thread formed on an outer circumferential surface and fastening the upper abutment piece and the lower abutment piece by screwing the external thread with an internal thread, and a snow guard portion extending upward from the upper abutment piece."

The snow guard fitting is that is used for the above-mentioned snow guard structure. The snow guard fitting having this configuration has an extremely simple configuration including the upper abutment piece having the snow guard portion, the lower abutment piece, and the external thread member fastening them, and can firmly fix the first frame body and the second frame body. Furthermore, the snow guard fitting can be easily detached from the first frame body and the second frame body by releasing the fastening by the external thread member. Therefore, the installation position of the snow guard fitting and the installation number thereof can be easily changed and the snow guard fitting can be easily replaced.

As described above, a snow guard structure in which a snow guard fitting can be mounted on roof on which a solar cell panel is installed with high degree of freedom of an installation position and the installation number thereof, and the snow guard fitting that is used for the snow guard structure can be provided as an effect of the invention.

BRIEF DESCRIPTION OF THE DRAWINGS

FIG. 5A to FIG. 5C are views for explaining attaching of the lower abutment piece of FIG. 4A to the frame bodies.

DESCRIPTION OF THE EMBODIMENTS

Figure 1A:
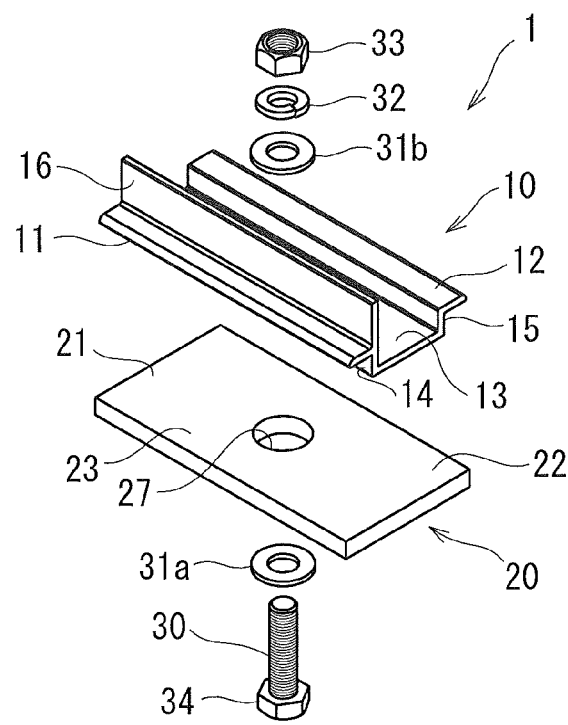
FIG. 1A is an exploded perspective view of a snow guard fitting according to a first embodiment of the invention and FIG. 1B is an exploded perspective view of the snow guard fitting when seen from an angle different from that of FIG. 1A.
Figure 1B:
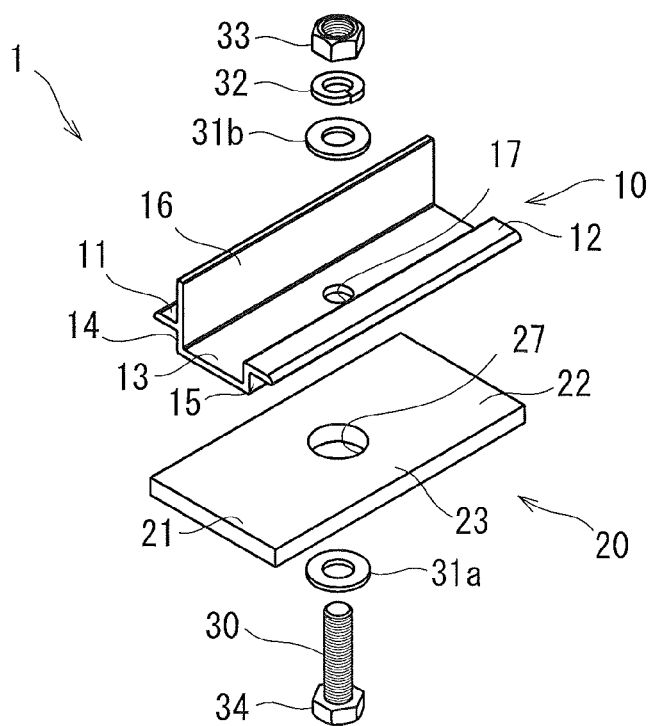

Hereinafter, a snow guard fitting 1 according to a first embodiment of the invention and a snow guard structure using the snow guard fitting 1 will be described with reference to FIGS. 1A and 1B, and FIGS. 2A to 2C.

The snow guard fitting 1 includes an upper abutment piece 10, a lower abutment piece 20, a long bar-shaped external thread member 30, and a snow guard portion 16. The upper abutment piece 10 has a first upper abutment portion 11 abutting against an upper face portion 41 of a first frame body 40a at one end side, a second upper abutment portion 12 abutting against an upper face portion 41 of a second frame body 40b at the other end side, and an upper connecting portion connecting the first upper abutment portion 11 and the second upper abutment portion 12. The lower abutment piece 20 has a first lower abutment portion 21 abutting against a bottom face portion 43 of the first frame body 40a at one end side, a second lower abutment portion 22 abutting against a bottom face portion 43 of the second frame body 40b at the other end side, and a lower connecting portion 23 connecting the first lower abutment portion 21 and the second lower abutment portion 22. The external thread member 30 has an external thread formed on the outer circumferential surface thereof and fastens the upper abutment piece 10 and the lower abutment piece 20 by screwing the external thread with an internal thread. The snow guard portion 16 extends upward from the upper abutment piece 10.

Furthermore, the upper connecting portion of the upper abutment piece 10 of the snow guard fitting 1 includes a first lateral face abutment portion 14 extending downward from an end of the first upper abutment portion 11, a second lateral face abutment portion 15 extending downward from an end of the second upper abutment portion 12, and a connecting intermediate portion 13 connecting the first lateral face abutment portion 14 and the second lateral face abutment portion 15.

To be more specific, the first upper abutment portion 11 of the upper abutment piece 10 has an elongated flat plate shape and the first lateral face abutment portion 14 extends downward from one long side of the first upper abutment portion 11 orthogonally. The flat plate-shaped connecting intermediate portion 13 extends toward the opposite side to the first upper abutment portion 11 from the lower end side of the first lateral face abutment portion 14 orthogonally. The second lateral face abutment portion 15 extends upward from the end side of the connecting intermediate portion 13 orthogonally to the same height as the first lateral face abutment portion 14. The flat plate-shaped second upper abutment portion 12 extends toward the opposite direction to the connecting intermediate portion 13 from the upper end side of the second lateral face abutment portion 15 orthogonally. That is to say, the upper abutment piece 10 has such a shape that the upper connecting portion (the first lateral face abutment portion 14, the connecting intermediate portion 13, and the second lateral face abutment portion 15) is recessed relative to both ends (the first upper abutment portion 11 and the second upper abutment portion 12) as a whole. The snow guard portion 16 extends upward in a flat plate form from the upper end of the first lateral face abutment portion 14, that is, the boundary between the first lateral face abutment portion 14 and the first upper abutment portion 11. A circular through-hole 17 is provided at the center of the upper abutment piece 10 (center of the connecting intermediate portion 13).

It should be noted that the upper abutment piece 10 is formed with metal integrally. For example, the integrally-shaped upper abutment piece 10 can be manufactured by cutting a long member, which is formed by extrusion molding of metal such as aluminum and having a single cross-sectional shape orthogonal to the axial direction, into a desired length.

The lower abutment piece 20 of the snow guard fitting 1 is formed by one flat plate made of metal so as to have a rectangle shape. One end side of the lower abutment piece 20 corresponds to the first lower abutment portion 21 and the other end side thereof corresponds to the second lower abutment portion 22. The lower connecting portion 23 connects the first lower abutment portion 21 and the second lower abutment portion 22 at the same height (on the same plane). The length of the lower abutment piece 20 in the direction toward the second lower abutment portion 22 from the first lower abutment portion 21, that is, the length of a pair of long sides of the lower abutment piece 20 having the rectangle shape is set to be larger than a space between the first frame body 40a and the second frame body 40b. Hereinafter, the space is referred to as an "inter-frame body distance". On the other hand, the length of the lower abutment piece 20 in the direction orthogonal to the above-mentioned direction, that is, the length of a pair of short sides of the lower abutment piece 20 having the rectangle shape is set to be smaller than the inter-frame body distance. A circular through-hole 27 is provided at the center of the lower connecting portion 23.

A head portion 34 having a larger diameter than that of the through-hole 27 of the lower abutment piece 20 is firmly attached to one end of the external thread member 30 of the snow guard fitting 1. The outer diameter of the external thread member 30 is smaller than the diameters of the through-hole 27 of the lower abutment piece 20 and the through-hole 17 of the upper abutment piece 10. Furthermore, the external thread member 30 that is sufficiently longer than the height of the first frame body 40a and the second frame body 40b (height of lateral face portions 42) is used. The snow guard fitting 1 includes a nut 33 having the internal thread that is screwed with the external thread of the external thread member 30.

Figure 2A:
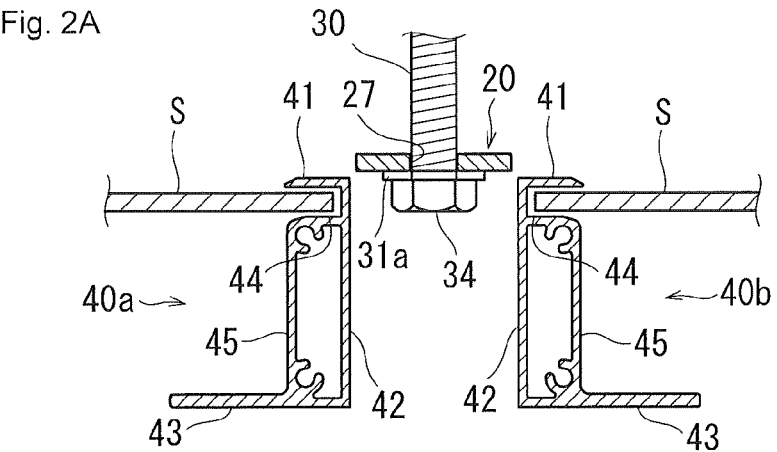
FIGS. 2A and 2B are views for explaining attaching of the snow guard fitting of FIGS. 1A and 1B to frame bodies of solar cell panels.
Figure 2B:
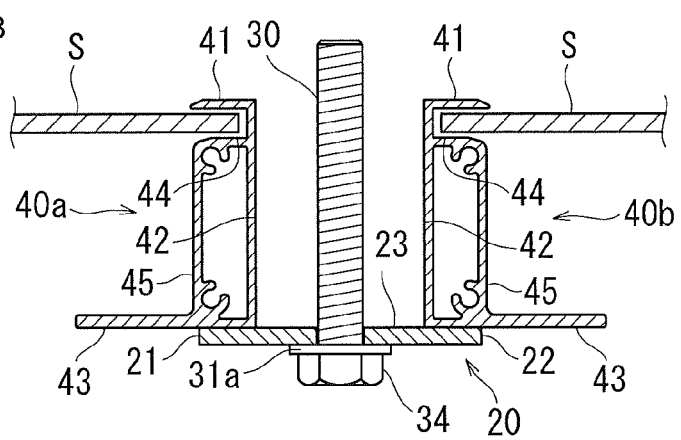
Figure 2C:
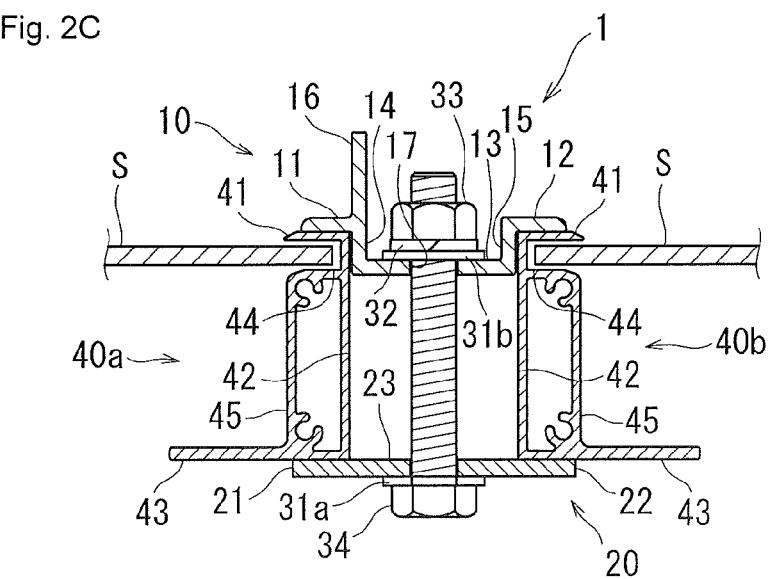
FIG. 2C is a cross-sectional view illustrating a state where the snow guard fitting of FIGS. 1A and 1B is attached to the frame bodies.

Next, a method for constructing the snow guard structure in the embodiment by attaching the snow guard fitting 1 to the first frame body 40a and the second frame body 40b will be described with reference to FIGS. 2A to 2C.

The first frame body 40a and the second frame body 40b to which the snow guard fitting 1 is attached have the same configuration and are distinguished from each other only in a positional relation to the snow guard fitting 1. To be more specific, each of the first frame body 40a and the second frame body 40b has the flat plate-shaped lateral face portion 42 extending vertically, the upper face portion 41 extending from the upper end of the lateral face portion 42 orthogonally, the bottom face portion 43 extending in the same direction as the upper face portion 41 from the lower end of the lateral face portion 42, a lower holding portion 44 extending from the lateral face portion 42 in the same direction as the upper face portion 41 under the upper face portion 41 and holding the end side of the solar cell panel S between the lower holding portion 44 and the upper face portion 41, and an inner wall portion 45 extending in parallel with the lateral face portion 42 and connecting the lower holding portion 44 and the bottom face portion 43. It should be noted that each of the first frame body 40a and the second frame body 40b is a long member having a single cross-sectional shape orthogonal to the axial direction and can be formed by extrusion molding of metal, for example.

The snow guard structure is constructed as follows. First, the first frame body 40a and the second frame body 40b each holding the solar cell panel S between the upper face portion 41 and the lower holding portion 44 are fixed onto the roof surface in a state where spaces are formed under the bottom face portions 43.

Then, the snow guard fitting 1 is mounted. First, the external thread member 30 is inserted through the through-hole 27 of the lower abutment piece 20 from below. At this time, the external thread member 30 is put through a flat washer 31a previously. In a state where the head portion 34 is located under the lower abutment piece 20 and the front end side of the external thread member 30 extends upward from the lower abutment piece 20, the lower abutment piece 20 is located above and between the first frame body 40a and the second frame body 40b at a desired mounting position by gripping a portion of the external thread member 30, which extends upward from the lower abutment piece 20. In this case, the direction of the short sides of the lower abutment piece 20 is set to the direction toward the second frame body 40b from the first frame body 40a (see FIG. 2A).

The external thread member 30 is made to descend from the above-mentioned position and the lower abutment piece 20 is inserted into between the lateral face portion 42 of the first frame body 40a and the lateral face portion 42 of the second frame body 40b so as to be located below the bottom face portions 43 of the first frame body 40a and the second frame body 40b. In this state, the external thread member 30 is made to rotate about its axis by 90 degrees. With this, the first lower abutment portion 21 is located under the bottom face portion 43 of the first frame body 40a and the second lower abutment portion 22 is located under the bottom face portion 43 of the second frame body. Thereafter, the external thread member 30 is pulled up so as to cause the first lower abutment portion 21 to abut against the bottom face portion 43 of the first frame body 40a and cause the second lower abutment portion 22 to abut against the bottom face portion 43 of the second frame body (see FIG. 2B).

Then, the upper abutment piece 10 is made close to the external thread member 30 from above and the external thread member 30 is inserted through the through-hole 17.

Furthermore, the first upper abutment portion 11 of the upper abutment piece 10 is made to abut against the upper face portion 41 of the first frame body 40a and the second upper abutment portion 12 is made to abut against the upper face portion 41 of the second frame body 40b. In addition, the first lateral face abutment portion 14 is made to abut against the lateral face portion 42 of the first frame body 40a and the second lateral face abutment portion 15 is made to abut against the lateral face portion 42 of the second frame body 40b. Subsequently, the internal thread of the nut 33 is screwed with the external thread of the external thread member 30 penetrating through the through-hole 17 of the upper abutment piece 10 and extending upward from the upper abutment piece 10. At this time, the external thread member 30 is put through a flat washer 31b and a spring washer 32, and then, the nut 33 is fitted. Then, the nut 33 is firmly tightened to the external thread member 30, thereby fastening the upper abutment piece 10 and the lower abutment piece 20 (see FIG. 2C).

In this manner, the upper abutment piece 10 and the lower abutment piece 20 are fastened by the external thread member 30 so as to hold the first frame body 40a and the second frame body 40b therebetween from above and below. With this, the snow guard fitting 1 is fixed to the first frame body 40a and the second frame body 40b and the snow guard structure in the embodiment is constructed.

That is to say, the snow guard structure in the embodiment is the snow guard structure including the snow guard fitting 1 which is mounted on the roof on which the solar cell panels are installed, wherein the first frame body 40a holding a ridge-side end side of the solar cell panel S arranged at the eaves side in the solar cell panels S arranged adjacently on the roof and the second frame body 40b holding an eaves-side end side of the solar cell panel S arranged at the ridge side are fixed onto the roof surface such that spaces are formed under the bottom face portions 43 of the first frame body 40a and the second frame body 40b, and the snow guard fitting 1 includes the upper abutment piece 10 having the first upper abutment portion 11 abutting against the upper face portion 41 of the first frame body 40a at one end side, the second upper abutment portion 12 abutting against the upper face portion 41 of the second frame body 40b at the other end side, and the upper connecting portion connecting the first upper abutment portion 11 and the second upper abutment portion 12, the lower abutment piece 20 having the first lower abutment portion 21 abutting against the bottom face portion 43 of the first frame body 40a at one end side, the second lower abutment portion 22 abutting against the bottom face portion 43 of the second frame body 40b on the other side, and the lower connecting portion 23 connecting the first lower abutment portion 21 and the second lower abutment portion 22, the external thread member 30 extending upward from the lower abutment piece 20 and penetrating through the upper abutment piece 10 and fastening the upper abutment piece 10 and the lower abutment piece 20 by screwing the external thread formed on the outer circumferential surface with the internal thread between the first frame body 40a and the second frame body 40b, and the snow guard portion 16 extending upward from the upper abutment piece 10 to be higher than the upper face portions 41 of the first frame body 40a and the second frame body 40b.

Figure 6:
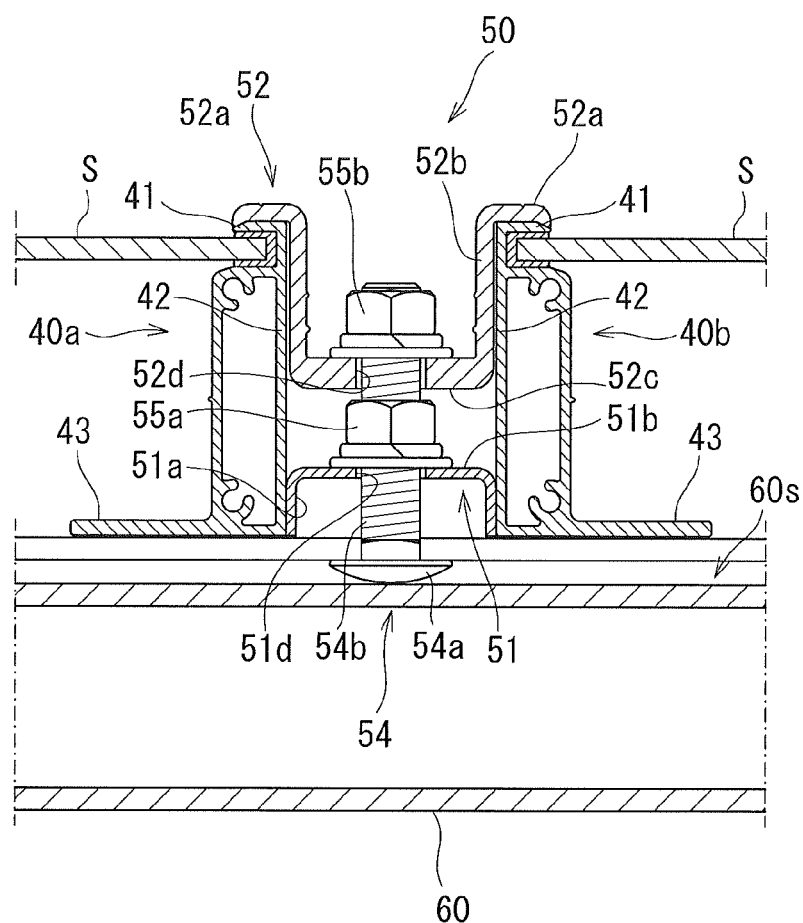
FIG. 6 is a cross-sectional view illustrating a state where the solar cell panels are fixed to crosspiece members through the frame bodies and fixing members.

In order to fix the first frame body 40a and the second frame body 40b onto the roof surface such that the spaces are formed under the corresponding bottom face portions 43, for example, a plurality of long crosspiece members 60 are arranged on the roof surface in parallel with the roof inclination direction. As illustrated in FIG. 6, the first frame body 40a and the second frame body 40b are mounted on the crosspiece members 60 using fixing members 50.

The fixing member 50 will be described in detail. The fixing member 50 includes a spacer member 51 and a pressing member 52. The spacer member 51 has a pair of leg plate portions 51a placed on the upper face of the crosspiece member 60 and a top board portion 51b connecting the upper ends of the pair of leg plate portions 51a. The pressing member 52 includes a pair of elongated flat plate-shaped pressing portions 52a abutting against the corresponding upper face portions 41 of the first frame body 40a and the second frame body 40b, a pair of standing plate portions 52b extending downward from corresponding inner end portions of the pair of pressing portions 52a orthogonally, and a flat plate-shaped base portion 52c connecting the pair of standing plate portions 52b. Through-holes 51d and 52d through which a bolt 54 penetrates are provided at the center of the top board portion 51b of the spacer member 51 and at the center of the base portion 52c of the pressing member 52, respectively.

As the crosspiece member onto which the first frame body 40a and the second frame body 40b are fixed with the fixing member 50 having the above configuration, the crosspiece member 60 that is formed by an angular steel pipe and is provided with a slit 60s extending in its axial direction on the upper face thereof can be used. The bolt 54 including a head portion 54a having a larger diameter than the width of the slit 60s and an external thread portion 54b having a smaller diameter than the width of the slit 60s is inverted and is inserted from an end portion of the slit 60s. Thus, the bolt 54 is made into a state where the head portion 54a is located in the slit 60s and the external thread portion 54b extends upward from the upper face of the crosspiece member 60. The bolt 54 in this state is made to slide along the slit 60s to a desired position at which the first frame body 40a and the second frame body 40b are fixed with the fixing member 50.

Subsequently, the spacer member 51 is made into a state where the pair of leg plate portions 51a face downward, and the external thread portion 54b of the bolt 54 is inserted through a through-hole 51d of the top board portion 51b from below. Furthermore, the spacer member 51 is placed on the upper face of the crosspiece member 60 while the direction in which the pair of leg plate portions 51a are separated from each other is made identical to the axial direction of the crosspiece member 60. A nut 55a is fitted to the external thread portion 54b extending upward from the top board portion 51b and the spacer member 51 is thereby fixed to the crosspiece member 60. In this state, the external thread portion 54b of the bolt 54 further extends upward from the nut 55a.

The first frame body 40a holding the solar cell panel S is placed on the upper face of the crosspiece member 60 such that the lateral face portion 42 of the first frame body 40a abuts against the outer side of the leg plate portion 51a located at the eaves side in the pair of leg plate portions 51a of the spacer member 51 fixed to the crosspiece member 60. Furthermore, the second frame body 40b holding the solar cell panel S is placed on the upper face of the crosspiece member 60 such that the lateral face portion 42 of the second frame body 40b abuts against the outer side of the leg plate portion 51a located at the ridge side. Thereafter, the external thread portion 54b extending upward from the nut 55a is inserted, from below, through the through-hole 52d of the pressing member 52 in a state of the base portion 52c facing downward. Then, one of the pair of pressing portions 52a of the pressing member 52 is made to abut against the upper face portion 41 of the first frame body 40a and one of the pair of standing plate portions 52b is made to abut against the lateral face portion 42 of the first frame body 40a. In addition, the other of the pressing portions 52a is made to abut against the upper face portion 41 of the second frame body 40b and the other of the standing plate portions 52b is made to abut against the lateral face portion 42 of the second frame body 40b.

In this state, a nut 55b is fitted with the external thread portion 54b extending upward from the pressing member 52. With this, the first frame body 40a and the second frame body 40b are fixed to the crosspiece member 60 so as to be pressed from above by the pressing member 52. The bottom face portions 43 of the first frame body 40a and the second frame body 40b are located to be higher than the roof surface by the height of the crosspiece members 60 between one crosspiece member 60 and the adjacent crosspiece member 60, thereby forming the spaces under the first frame body 40a and the second frame body 40b.

It should be noted that the bolt 54 may be inserted into the slit 60s of the crosspiece member 60 in a state where the bolt 54 temporarily fixes the spacer member 51 and the pressing member 52 by screwing the nuts 55a and 55b with the external thread portion 54b previously.

As described above, with the snow guard structure in the embodiment, the snow guard portion 16 extends upward to be higher than the upper face portions 41 of the first frame body 40a and the second frame body 40b holding the solar cell panels S. Therefore, the snow guard portion 16 can prevent the slip-down and falling of snow accumulated on the solar cell panels S.

Furthermore, with the snow guard structure in the embodiment, the upper abutment piece 10 and the lower abutment piece 20 fastened by the external thread member 30 support the first frame body 40a and the second frame body 40b therebetween from above and below, so that the snow guard fitting 1 is held on the first frame body 40a and the second frame body 40b. Accordingly, the installation position of the snow guard fitting 1 and the installation number thereof can be set with high degree of freedom independently of members for fixing the first frame body 40a and the second frame body 40b onto the roof surface in order to install the solar cell panels S on the roof.

In addition, the snow guard fitting 1 has the configuration in which the upper abutment piece 10 and the lower abutment piece 20 as the separate bodies are integrated with each other by the external thread member 30. Therefore, the snow guard fitting 1 can be installed at a desired position even after the two frame bodies are fixed onto the roof.

Furthermore, the lower abutment piece 20 of the snow guard fitting 1 has the rectangle shape and the short sides thereof are smaller than the inter-frame body distance. Accordingly, when the snow guard fitting 1 is installed, the lower abutment piece 20 can be inserted into between the first frame body 40a and the second frame body 40b from above at a desired attaching position. This enables an installation operation to be performed easily and enables the snow guard fitting 1 to be installed even between the fixing member 50 and the fixing member 50 for fixing the first frame body 40a and the second frame body 40b to the crosspiece member 60.

With the snow guard fitting 1, the distance between the upper abutment piece 10 and the lower abutment piece 20 that are fastened by the external thread member 30 can be varied within a range of the length of the external thread member 30. This provides an advantage that the degree of freedom of the height of the first frame body 40a and the second frame body 40b to which the snow guard fitting 1 is attached is increased. The length of the external thread member 30 can be set in accordance with the height of the first frame body 40a and the second frame body 40b to which the snow guard fitting 1 is attached.

The snow guard fitting 1 can be attached to the first frame body 40a and the second frame body 40b only by fastening the upper abutment piece 10 and the lower abutment piece 20 by the external thread member 30. Therefore, the configuration of the snow guard fitting 1 is extremely simple and the snow guard structure can be constructed extremely simply in comparison with the case where the snow guard fitting can be fixed to the frame bodies using screws, nails, or the like.

In addition, the snow guard fitting 1 is firmly fixed to the first frame body 40a and the second frame body 40b by fastening the upper abutment piece 10 and the lower abutment piece 20 by the external thread member 30. Therefore, the snow guard structure excellent in resistance to load of accumulated snow can be constructed.

Furthermore, the snow guard fitting 1 can be easily detached from the first frame body 40a and the second frame body 40b by releasing the fastening by the external thread member 30. Therefore, the installation position of the snow guard fitting 1 and the installation number thereof can be easily changed and the snow guard fitting 1 can be easily replaced.

Moreover, the upper abutment piece 10 includes the first lateral face abutment portion 14 and the second lateral face abutment portion 15 abutting against the corresponding lateral face portions 42 of the first frame body 40a and the second frame body 40b. With the abutment, even when external force is applied to the snow guard portion 16, the upper abutment piece 10 is not deviated from the first frame body 40a and the second frame body 40b. Therefore, the posture of the snow guard fitting 1 is stable.

Figure 3A:
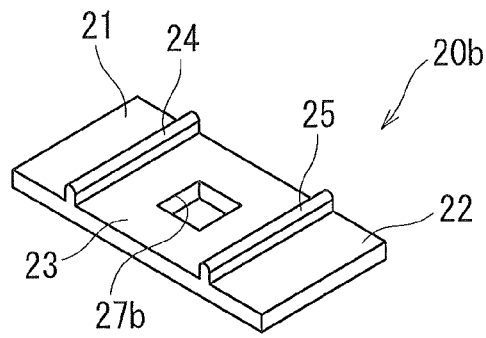
FIG. 3A is a perspective view of a lower abutment piece of a snow guard fitting according to a second embodiment of the invention.
Figure 3B:
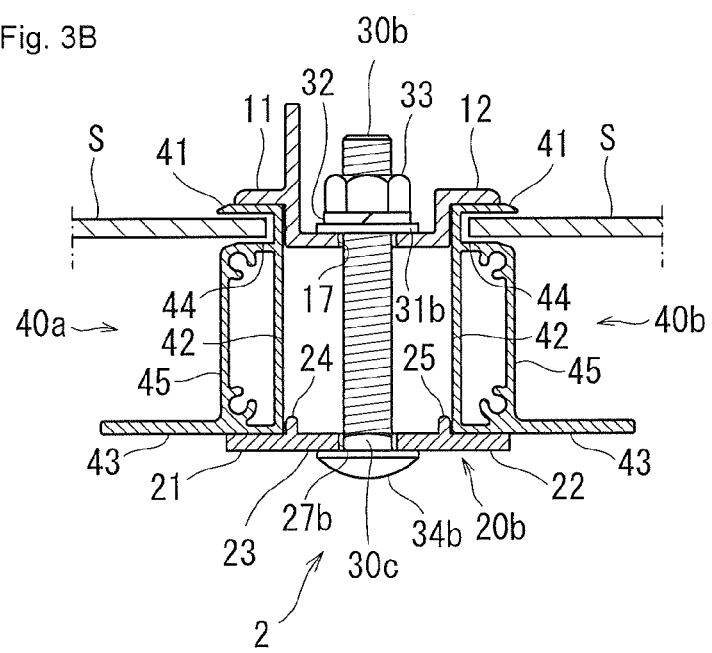
FIG. 3B is a cross-sectional view illustrating a state where the snow guard fitting in the second embodiment is attached to the frame bodies of the solar cell panels and FIG. 3C is a perspective view illustrating a non-circular root portion of an external thread member.
Figure 3C:
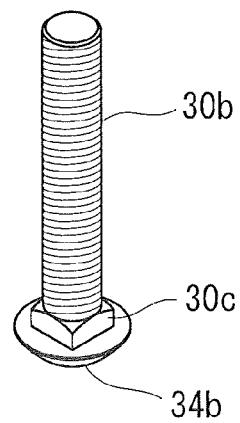

Next, a snow guard fitting 2 according to a second embodiment will be described with reference to FIGS. 3A and 3B. The snow guard fitting 2 in the second embodiment is different from the snow guard fitting 1 in the first embodiment in a shape of a lower abutment piece. A lower abutment piece 20b of the snow guard fitting 2 includes a first projecting portion 24 and a second projecting portion 25. The first projecting portion 24 extends upward from the boundary between the first lower abutment portion 21 and the lower connecting portion 23 and abuts against the lateral face portion 42 of the first frame body 40a. The second projecting portion 25 extends upward from the boundary between the second lower abutment portion 22 and the lower connecting portion 23 and abuts against the lateral face portion 42 of the second frame body 40b. Furthermore, a through-hole 27b bored at the center of the lower abutment piece 20b is a square hole having the inner circumferential sides of a pair of sides in parallel with a pair of lateral sides extending in the direction toward the second lower abutment portion 22 from the first lower abutment portion 21 and a pair of sides orthogonal to the sides. An external thread member 30b includes a square root portion 30c having a rectangular columnar shape on a base portion that is connected to a head portion 34b. The square root portion 30c has a square cross-sectional outer shape and has a size slightly smaller than the square formed by the inner circumference of the through-hole 27b.

The snow guard fitting 2 having this configuration can be attached to the first frame body 40a and the second frame body 40b in the same manner as the snow guard fitting 1.

With this, the snow guard structure similar to the above-mentioned snow guard structure is constructed, thereby obtaining similar actions and effects. In addition, with the snow guard structure constructed using the snow guard fitting 2, the first projecting portion 24 abuts against the lateral face portion 42 of the first frame body 40a and the second projecting portion 25 abuts against the lateral face portion 42 of the second frame body 40b. Therefore, even when the external thread member 30b is tried to rotate in a state where the first lower abutment portion 21 and the second lower abutment portion 22 are made to abut against the corresponding bottom face portions 43 of the first frame body 40a and the second frame body 40b, the lower abutment piece 20b does not rotate. With this, an operation of fastening the lower abutment piece 20b with the upper abutment piece 10 by the external thread member 30b after the lower abutment piece 20b is made to abut against the corresponding bottom face portions 43 of the first frame body 40a and the second frame body 40b can be performed easily. Furthermore, the lower abutment piece 20b abuts against not only the bottom face portions 43 of the first frame body 40a and the second frame body 40b from below with the first lower abutment portion 21 and the second lower abutment portion 22 but also the lateral face portions 42 of the first frame body 40a and the second frame body 40b outward between the frame bodies with the first projecting portion 24 and the second projecting portion 25. Therefore, a posture in which the snow guard fitting 2 is fixed to the first frame body 40a and the second frame body 40b can be made more stable.

In addition, the through-hole 27b of the lower abutment piece 20b is square and the square root portion 30c of the external thread member 30b is fitted into the through-hole 27b. Therefore, in a state where the external thread member 30b is inserted through the through-hole 27b, the lower abutment piece 20b rotates integrally with the external thread member 30b. With this, in an operation of rotating the lower abutment piece 20b in the direction of being inserted into the space between the first frame body 40a and the second frame body 40b by gripping the external thread member 30b and an operation of rotating the lower abutment piece 20b with the external thread member 30b in order to make the lower abutment piece 20b abut against the respective bottom face portions 43 of the first frame body 40a and the second frame body 40b after the lower abutment piece 20b is inserted to a position lower than the bottom face portions 43 in the space between the first frame body 40a and the second frame body 40b, the external thread member 30b is prevented from spinning independently of the lower abutment piece 20b. This can perform the operations easily.

Figure 4A:
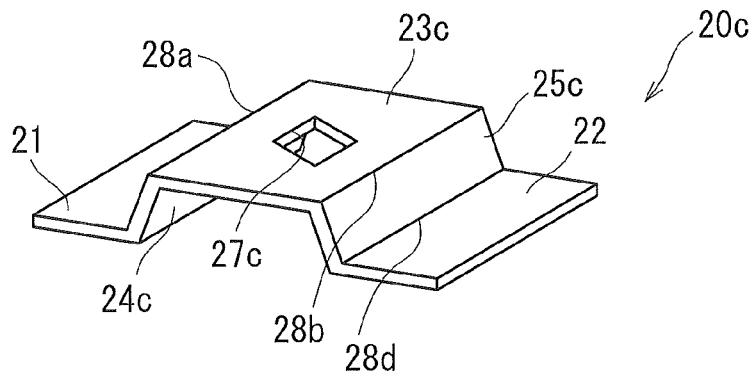
FIG. 4A is a perspective view of a lower abutment piece of a snow guard fitting according to a third embodiment of the invention.
Figure 4B:
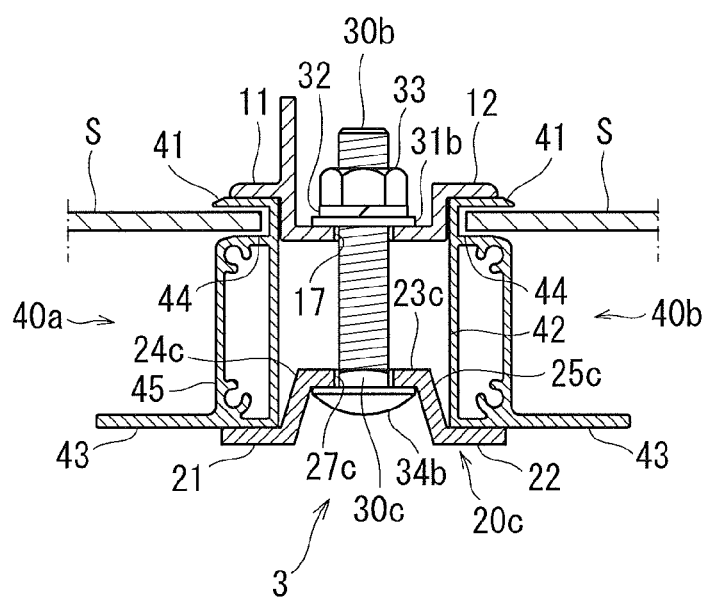
FIG. 4B is a cross-sectional view illustrating a state where the snow guard fitting in the third embodiment is attached to the frame bodies of the solar cell panels.

Next, a snow guard fitting 3 according to a third embodiment will be described with reference to FIGS. 4A to 4C and FIGS. 5A to 5C. The snow guard fitting 3 in the third embodiment is different from the snow guard fitting 1 in the first embodiment in a shape of a lower abutment piece. A lower abutment piece 20c of the snow guard fitting 3 has the configuration in which the first lower abutment portion 21 and the second lower abutment portion 22 are connected by a lower connecting portion with a portion having the height different from those of the first lower abutment portion 21 and the second lower abutment portion 22. To be more specific, as illustrated in FIGS. 4A and 4B, the lower connecting portion includes a connecting intermediate portion 23c, a first inclined wall 24c, and a second inclined wall 25c. The connecting intermediate portion 23c is located at a position higher than the first lower abutment portion 21 and the second lower abutment portion 22. The first inclined wall 24c is inclined toward the first lower abutment portion 21 from the connecting intermediate portion 23c and is connected to the first lower abutment portion 21. The second inclined wall 25c is inclined toward the second lower abutment portion 22 from the connecting intermediate portion 23c and is connected to the second lower abutment portion 22.

Figure 4C:
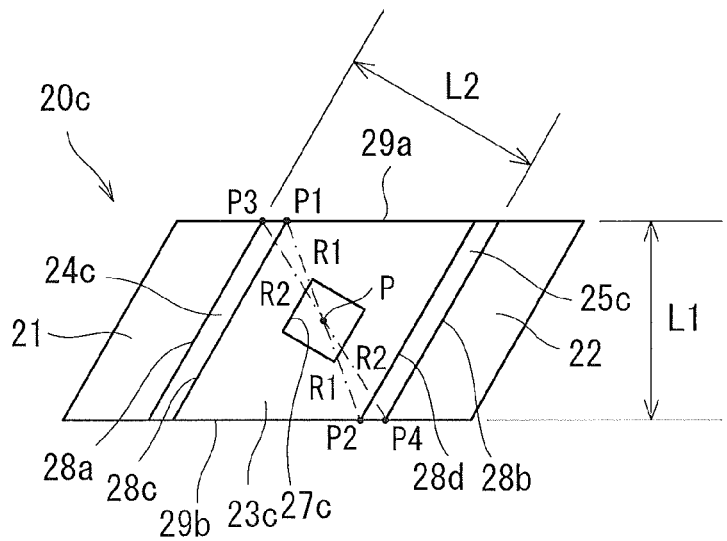
FIG. 4C is a plan view of the lower abutment piece of FIG. 4A.

As illustrated in FIG. 4C, the outer shape of the lower abutment piece 20c is parallelogram in planar view. A boundary line 28a between the first lower abutment portion 21 and the first inclined wall 24c, a boundary line 28b between the second lower abutment portion 22 and the second inclined wall 25c, a boundary line 28c between the first inclined wall 24c and the connecting intermediate portion 23c, and a boundary line 28d between the second inclined wall 25c and the connecting intermediate portion 23c are parallel with one another. A square through-hole 27c is provided at the center of the lower abutment piece 20c (at the center of the connecting intermediate portion 23c) and the inner circumferential sides thereof are formed by a pair of sides parallel with the four parallel boundary lines 28a, 28b, 28c, and 28d and a pair of sides orthogonal to the sides. The external thread member 30b having the square root portion 30c is inserted through the through-hole 27c in the same manner as the snow guard fitting 2 in the second embodiment.

In planar view, both of a distance (L1 in the drawing) between a pair of lateral sides 29a and 29b extending in the direction toward the second lower abutment portion 22 from the first lower abutment portion 21 and a distance (L2 in the drawing) between the boundary line 28a and the boundary line 28b are set to be slightly smaller than the inter-frame body distance (for example, by −2% to −5%). In addition, in planar view, a distance (R1 in the drawing) between the center point P of the through-hole 27c and an intersection P1 of the lateral side 29a and the boundary line 28c as a smaller distance of distances to the two intersections of the pair of lateral sides 29a and 29b and the boundary line 28c from the center point P and a distance (R1 in the drawing) between the center point P of the through-hole 27c and an intersection P2 of the lateral side 29b and the boundary line 28d as a smaller distance of distances to the two intersections of the pair of lateral sides 29a and 29b and the boundary line 28d from the center point P are set to be slightly smaller than the half of the inter-frame body distance (for example, by −0.3% to −1%). In the same manner, in planar view, a distance (R2 in the drawing) between the center point P and an intersection P3 of the lateral side 29a and the boundary line 28a as a smaller distance of distances to the two intersections of the pair of lateral sides 29a and 29b and the boundary line 28a from the center point P and a distance (R2 in the drawing) between the center point P and an intersection P4 of the lateral side 29b and the boundary line 28b as a smaller distance of distances to the two intersections of the pair of lateral sides 29a and 29b and the boundary line 28b from the center point P are set to be slightly larger than the half of the inter-frame body distance (for example, by +8% to +12%).

Attaching of the snow guard fitting 3 having the above configuration to the first frame body 40a and the second frame body 40b will be described with reference to FIG. 5A to FIG. 5C. First, in a state where the pair of lateral sides 29a and 29b of the lower abutment piece 20c are made parallel with the lateral face portions 42 of the first frame body 40a and the second frame body 40b, the lower abutment piece 20c is inserted into the space between the first frame body 40a and the second frame body 40b from above (see FIG. 5A) by gripping the external thread member 30b inserted through the through-hole 27c. The lower abutment piece 20c is located such that the first lower abutment portion 21 and the second lower abutment portion 22 are lower than the corresponding bottom face portions 43 of the first frame body 40a and the second frame body 40b and the connecting intermediate portion 23c is higher than the bottom face portions 43. In this state, the external thread member 30b is made to rotate in the direction in which the intersections P1 and P3 further make close to the closer frame body (the first frame body 40a in the drawing) of the first frame body 40a and the second frame body 40b, thereby rotating the lower abutment piece 20c with rotation of the external thread member 30b about its axis. The distance R1 is smaller than the half of the inter-frame body distance and the distance R2 is larger than the half of the inter-frame body distance as described above. Therefore, the lateral side 29a of the first inclined wall 24c and the lateral side 29b of the second inclined wall 25c abut against the lower sides of the corresponding lateral face portions 42 of the first frame body 40a and the second frame body 40b (see FIG. 5B).

In this state, when rotating force in the same direction is further applied to the external thread member 30b, the lower abutment piece 20c rotates such that the first lower abutment portion 21 gets into under the bottom face portion 43 of the first frame body 40a and the second lower abutment portion 22 gets into under the bottom face portion 43 of the second frame body 40b by being guided by the inclination of the lateral side 29a of the first inclined wall 24c and the inclination of the lateral side 29b of the second inclined wall 25c, respectively. The first lower abutment portion 21 can be made to abut against the bottom face portion 43 of the first frame body 40a and the second lower abutment portion 22 can be made to abut against the bottom face portion 43 of the second frame body 40b (see FIG. 5C) by pulling up the lower abutment piece 20c using the external thread member 30b from the above-mentioned state. Therefore, the snow guard fitting 3 can be attached to the first frame body 40a and the second frame body 40b by fastening the lower abutment piece 20c and the upper abutment piece 10 by the external thread member 30b.

With the snow guard fitting 3, the snow guard fitting 3 can be attached to the first frame body 40a and the second frame body 40b easily by a guiding action by the inclinations of the lateral side 29a of the first inclined wall 24c and the lateral side 29b of the second inclined wall 25c. Furthermore, the snow guard structure similar to the above-mentioned snow guard structures can be constructed by attaching the snow guard fitting 3 to the first frame body 40a and the second frame body 40b, thereby obtaining similar actions and effects.

Although the invention has been described using the preferable embodiments as described above, the invention is not limited to the above-mentioned embodiments and various improvements and changes in design can be made in a range without departing from the scope of the invention.

For example, the snow guard fitting 2 has the configuration in which the lower connecting portion 23 has the same height (is formed on the same plane) as those of the first lower abutment portion 21 and the second lower abutment portion 22 and the first projecting portion 24 and the second projecting portion 25 are not constituent components of the lower connecting portion 23 in the second embodiment. However, the snow guard fitting is not limited thereto and can be configured to include a lower connecting portion having the first projecting portion 24, the second projecting portion 25, and a connecting intermediate portion connecting the upper end of the first projecting portion 24 and the upper end of the second projecting portion 25.

What is claimed is:

1. A snow guard structure including a snow guard fitting which is mounted on roof on which solar cell panels are installed,
wherein a first frame body holding a ridge-side end side of the solar cell panel arranged at an eaves side in the solar cell panels arranged adjacently on the roof and a second frame body holding an eaves-side end side of the solar cell panel arranged at a ridge side are fixed onto a roof surface such that spaces are formed under bottom face portions of the first frame body and the second frame body, and
the snow guard fitting includes:
an upper abutment piece having a first upper abutment portion abutting against an upper face portion of the first frame body at one end side, a second upper abutment portion abutting against an upper face portion of the second frame body at the other end side, and an upper connecting portion connecting the first upper abutment portion and the second upper abutment portion;
a lower abutment piece having a first lower abutment portion abutting against a bottom face portion of the first frame body at one end side, a second lower abutment portion abutting against a bottom face portion of the second frame body at the other end side, and a lower connecting portion connecting the first lower abutment portion and the second lower abutment portion, the lower connecting portion further including a connecting intermediate portion located at a position higher than the first lower abutment portion and the second lower abutment portion, a first inclined wall inclined from the connecting intermediate portion toward the first lower abutment portion, and a second inclined wall inclined from the connecting intermediate portion toward the second lower abutment portion, the lower abutment piece having an outer shape of a parallelogram in planar view, wherein a distance L1 between a pair of lateral sides, each of which extends in the direction toward the second lower abutment portion from the first lower abutment portion, is smaller than an inter-frame body distance between the first frame body and the second frame body while a distance L2 between a boundary line B1 and a boundary line B2 is smaller than the inter-frame body distance, wherein the boundary line B1 is the boundary line between the first lower abutment portion and the first inclined wall while the boundary line B2 is the boundary line between the second lower abutment portion and the second inclined wall;
an external thread member extending upward from the lower abutment piece and penetrating through the upper abutment piece such that the upper abutment piece and the lower abutment piece are fastened, and an external thread formed on an outer circumferential surface is screwed in with an internal thread between the first frame body and the second frame body, wherein as the lower abutment piece is configured to rotate as the external thread member is rotated, the first lower abutment portion engages with the bottom face portion of the first frame body as being guided by the first inclined wall while the second lower abutment portion engages with the bottom face portion of the second frame body as being guided by the second inclined wall;
and a snow guard portion extending upward from the upper abutment piece to be higher than upper face portions of the first frame body and the second frame body.

2. A snow guard structure including a snow guard fitting which is mounted on roof on which solar cell panels are installed,
wherein a first frame body holding a ridge-side end side of the solar cell panel arranged at an eaves side in the solar cell panels arranged adjacently on the roof and a second frame body holding an eaves-side end side of the solar cell panel arranged at a ridge side are fixed onto a roof surface such that spaces are formed under bottom face portions of the first frame body and the second frame body, and
the snow guard fitting includes:
an upper abutment piece having a first upper abutment portion abutting against an upper face portion of the first frame body at one end side, a second upper abutment portion abutting against an upper face portion of the second frame body at the other end side, and an upper connecting portion connecting the first upper abutment portion and the second upper abutment portion and having a through-hole;
a lower abutment piece having a first lower abutment portion abutting against a bottom face portion of the first frame body at one end side, a second lower abutment portion abutting against a bottom face portion of the second frame body at the other end side, and a lower connecting portion connecting the first lower abutment portion and the second lower abutment portion and having a non-circular through-hole, the lower connecting portion further including a first inclined wall inclined from a connecting intermediate portion toward the first lower abutment portion, and a second inclined wall inclined from the connecting intermediate portion toward the second lower abutment portion, the lower abutment piece having an outer shape of a parallelogram in planar view;
an external thread member having a head portion that is larger than the non-circular through-hole and a non-circular root portion in a corresponding non-circular columnar shape that is integrally formed with the head portion, the external thread member extending upward from the lower abutment piece through the non-circular through-hole with the non-circular root portion engaged in the non-circular through-hole and penetrating through the upper abutment piece through the through-hole and fastening the upper abutment piece and the lower abutment piece by screwing an external thread formed on an outer circumferential surface with an internal thread between the first frame body and the second frame body, wherein the lower abutment piece is configured to rotate guided by the first inclined wall and the second inclined wall as the external thread member is rotated; and
a snow guard portion extending upward from the upper abutment piece to be higher than upper face portions of the first frame body and the second frame body.

3. The snow guard structure according to claim 2, wherein the lower abutment piece of the snow guard fitting has a maximum length between a pair of lateral sides, each of which extends in a direction toward the second lower abutment portion from the first lower abutment portion, is the maximum length being smaller than a space between the first frame body and the second frame body.

4. The snow guard structure according to claim 2, wherein the upper connecting portion of the snow guard fitting has a first lateral face abutment portion extending downward from the first upper abutment portion and abutting against a lateral face portion of the first frame body, a second lateral face abutment portion extending downward from the second upper abutment portion and abutting against a lateral face portion of the second frame body, and a connecting intermediate portion connecting the first lateral face abutment portion and the second lateral face abutment portion.

* * * * *